US007772945B2

(12) United States Patent
Lange

(10) Patent No.: US 7,772,945 B2

(45) Date of Patent: Aug. 10, 2010

(54) ELECTRICAL SWITCHING DEVICE

(75) Inventor: Dale Walter Lange, Edmonds, WA (US)

(73) Assignee: Jackson Edmonds, LLC, Kirkland, WA (US)

( * ) Notice: Subject to any disclaimer, the term of this patent is extended or adjusted under 35 U.S.C. 154(b) by 16 days.

(21) Appl. No.: 11/870,971

(22) Filed: Oct. 11, 2007

(65) Prior Publication Data

US 2009/0096558 A1 Apr. 16, 2009

(51) Int. Cl.

| | |
|---|---|
| ***H01H 67/02*** | (2006.01) |
| ***H01H 9/20*** | (2006.01) |
| ***H01H 9/00*** | (2006.01) |
| ***H01H 19/64*** | (2006.01) |
| ***H01H 33/52*** | (2006.01) |
| ***H01H 85/46*** | (2006.01) |
| ***H01H 3/00*** | (2006.01) |
| ***H01H 9/54*** | (2006.01) |
| ***H02B 1/24*** | (2006.01) |

(52) U.S. Cl. ....................... 335/167; 335/113; 335/172; 307/113; 307/139

(58) Field of Classification Search ......... 335/167–176, 335/113

See application file for complete search history.

(56) References Cited

U.S. PATENT DOCUMENTS 2,283,795 A * 5/1942 Dahl .......................... 200/243
2,616,010 A * 10/1952 Scheib, Jr. .................. 200/284
3,599,047 A * 8/1971 Magarian .................... 361/661
4,337,447 A * 6/1982 Lemmer ...................... 335/167
4,388,535 A * 6/1983 Wiktor et al. ............... 307/113
4,430,579 A * 2/1984 Wiktor ....................... 307/134
5,173,673 A * 12/1992 Weigand et al. ............... 335/18
5,982,259 A * 11/1999 Godfrey et al. ............. 335/177
6,020,801 A * 2/2000 Passow ........................ 335/78
6,975,191 B2 * 12/2005 Ward ........................... 335/18

* cited by examiner

*Primary Examiner*—Elvin G Enad
*Assistant Examiner*—Alexander Talpalatskiy
(74) *Attorney, Agent, or Firm*—Armstrong Teasdale LLP

(57) ABSTRACT

An electrical switching device facilitates selectively controlling residential power. The switching device is configured to couple between a residential electrical-energy meter and a residence. The device includes a solenoid assembly, a yoke, and at least two conductor busbars. The solenoid assembly includes an electrically-activated solenoid that is coupled to an actuator assembly. The actuator assembly includes a biasing mechanism and a plunger. The yoke is coupled to the actuator plunger such that the plunger is substantially centered relative to the yoke. The biasing mechanism is coupled to the yoke to bias the yoke away from the solenoid. The yoke includes at least two shorting bars that are oriented in a mirrored-arrangement on opposite sides of the actuator plunger. The solenoid assembly selectively moves the yoke between a first position in which the shorting bars are spaced a distance away from the conductor busbars, and a second position in which each of the shorting bars are electrically coupled against the conductor busbars. Each of the at least two conductor busbars has a substantially rectangular-shaped cross-sectional profile.

19 Claims, 4 Drawing Sheets

ELECTRICAL SWITCHING DEVICE

BACKGROUND OF THE INVENTION

This invention relates generally to electrical switching devices and, more particularly, to electrical switches that are capable of handling current transfers of up to, or greater than, 200 amps.

In North America, consumers coupled to the electric grid are supplied power with a 2-phase/180° supply. As inflation, as well as the cost of power generation has increased, the costs of supplying power to electrical consumers has also increased. Unfortunately for power distribution companies, the number of electrical utility consumers defaulting on their power bills has also increased. Often, the only recourse for a utility company is to shut-off the power to each defaulting consumer. Utility companies also selectively shut off electrical power to consumers, for a variety of other reasons, such as to enable maintenance to be safely performed.

To shut off the power to an electrical utility consumer, often the utility companies are required to dispatch at least one utility person to the site to disconnect that consumer from the electrical distribution grid. To enhance the power control capabilities of utilities, at least some utility revenue meters are equipped with an electrical switching element that works in cooperation with remote access and control capabilities integrated in the meter. Such electrical switching elements are generally placed in series between the meter and the electrical grid.

At least some known switching elements use some form of electromechanical, magnetically-latching, and/or electrically-controlled solenoid to open or close electrical switching contacts. Opening and closing the electrical switching contacts enables the electrical power supplied to the consumer to be selectively disconnected and/or reconnected. For example, U.S. Pat. No. 6,292,075 to Connell et al., describes a two pole contactor that functions with a solenoid plunger actuator to impart a switching force within the switching element.

Within known switching elements, to limit arcing during operation, the switching force must generally be of a sufficient magnitude to enable the electrical contacts to be rapidly closed or opened. However, although at least some known switching elements are described has having a full load current rating of at least 200 amps, it is not uncommon that such switching elements are derated for only being used with current ratings of 150 amps or less. One reason for such derates is that some of the known switching elements may overheat when operated at the full load current rating. Moreover, because of their internal design, at least some known switching elements have limited switching cycles that may limit their useful life.

For example, at least some known switching elements include copper conductor busbars that transmit the current through the device. To increase the manufacturers ability to use the same conductor buss in different switching element designs, and to minimize the number of switching elements used in the construction of remote meter reading systems, the cross-sectional areas of known copper conductor busbars has been decreased until a flexible, conducting hinge is defined within the busbar. In addition, within at least some known switching elements, such conductor busbars are fabricated with a generally long length that includes a plurality of bends formed between the ends of each busbar. As is known, heat rise within such switching elements is directly proportional to the level of current conducted through the switching device. As such, the reduced cross sectional area of such conductor busses may contribute to the overall switch heat rise. Moreover, the inclusion of bends within such busbars may also cause local thermal stresses to develop.

In addition, depending on the design of the solenoid in known switches, the amount of magnetic latching, i.e., the holding force, may limit the use of the switching element. For example, within at least some known switching elements, the holding force generated by the solenoid may not be sufficient to adequately control heat rise within the switching element during use. Depending on the level of heat rise, the accuracy of the associated meter may decrease.

Accordingly, there is a need for an electrical switching device that is capable of handling currents up to, or greater than, 200 amps and operating with improved heat rise characteristics. Moreover, there is a need for an electrical switching device that has improved performance reliability and is of a design that enables the switching device to be used with a plurality of different meters commercially available from a plurality of different manufactures, and with a plurality of different meter components, such as, but not limited to, extension collars and/or sockets defined within the meter.

BRIEF DESCRIPTION OF THE INVENTION

In one aspect, an electrical switching device for use with an electrical-energy meter is provided. The switching device includes a solenoid assembly, a yoke, and at least two conductor busbars. The solenoid assembly includes an electromagnetic solenoid, an actuator plunger coupled to the solenoid, and at least one magnet. The yoke is coupled to the actuator plunger such that the yoke is biased away from the solenoid. The yoke includes at least one shorting bar. The at least two conductor busbars are electrically coupled within the switching device such that at least a first circuit and a second circuit are defined within the switching device. The solenoid assembly is configured to selectively move the yoke between a first position, in which each shorting bar is a distance away from the at least two conductor busbars, and a second position, in which at least one shorting bar is electrically coupled against at least one of the at least two conductor busbars. Each of the two conductor busbars includes a first side, a second side, and a body extending therebetween, wherein the body has a substantially rectangular cross-sectional profile.

In another aspect, an electrical switching device for use in selectively controlling residential power is provided. The switching device is configured to couple between a residential electrical-energy meter and a residence. The switching device includes a solenoid assembly, a yoke, and at least two conductor busbars. The solenoid assembly includes an electrically-activated solenoid that is coupled to an actuator assembly. The actuator assembly includes a biasing mechanism and a plunger. The yoke is coupled to the actuator plunger such that the actuator plunger is substantially centered relative to the yoke. The biasing mechanism is coupled to the yoke such that the yoke is biased away from the solenoid. The yoke includes at least two shorting bars that are oriented in a mirrored-arrangement on opposite sides of the actuator plunger. The conductor busbars are coupled within the switching device. The solenoid assembly is configured to selectively move the yoke between a first position in which the at least two shorting bars are spaced a distance away from the at least two conductor busbars, and a second position in which each of the shorting bars are electrically coupled against at least one of the at least two conductor busbars. Each of the at least two conductor busbars has a substantially rectangular-shaped cross-sectional profile.

DETAILED DESCRIPTION OF THE INVENTION

Described in detail below are exemplary embodiments of electrical switching devices that facilitate the remote control of electrical power. The systems of the present invention also facilitate increasing the flexibility of the manufacturer during the assembly of the switching device and/or utility revenue meter. More specifically, the systems of the present invention provide a means by which power load supplied to a customer can be disconnected via a manual switch operation, and/or may be disconnected via remote control inputs. Advantageously, reconnection of the power feed can be accomplished by the customer at the direction of the utility company.

Figure 1:
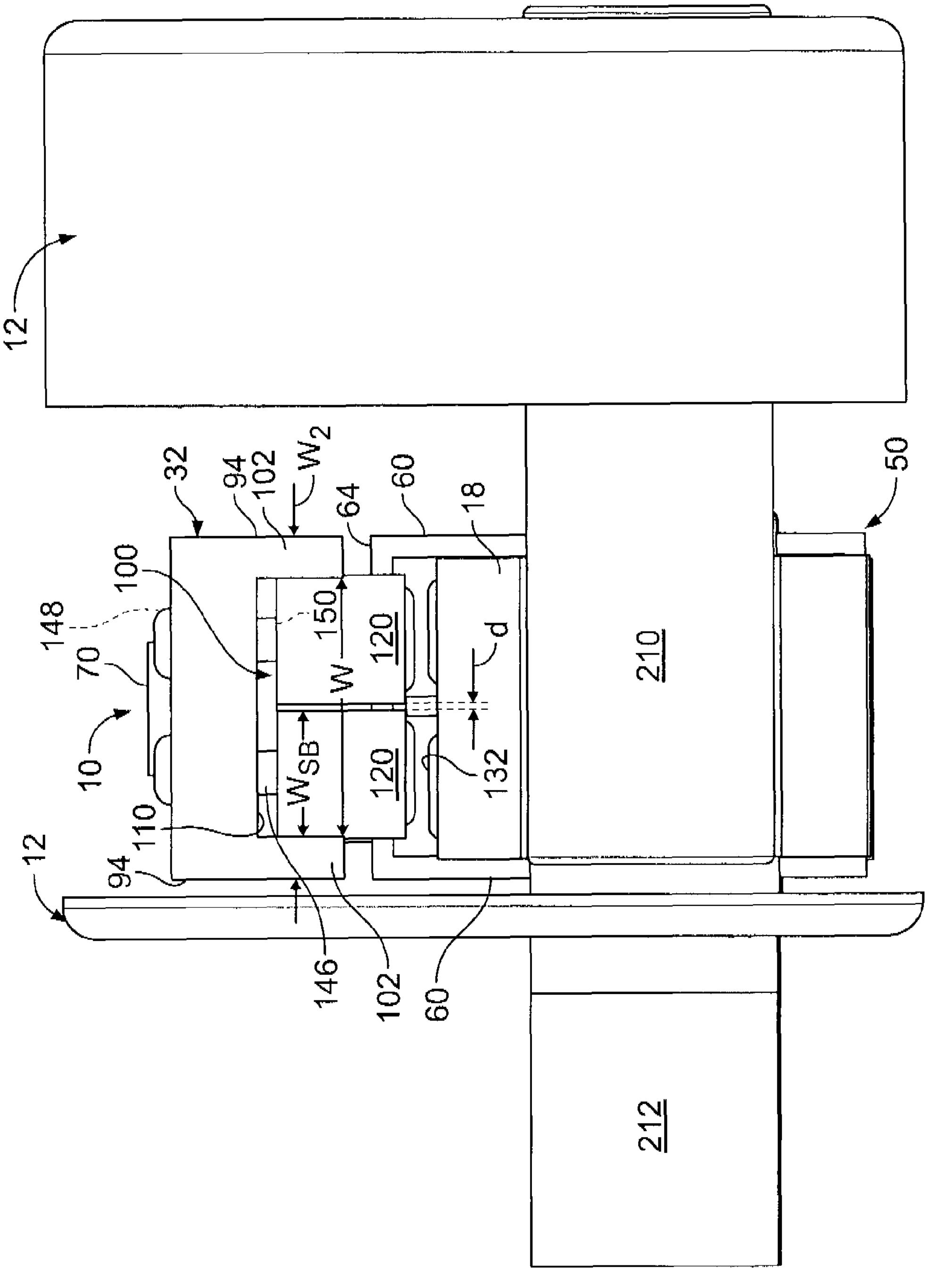
FIG. 1 is a partial cross-sectional side view of an exemplary electrical switching device electrically coupled to a known utility revenue meter mounted to determine power consumption within a building.
Figure 2:
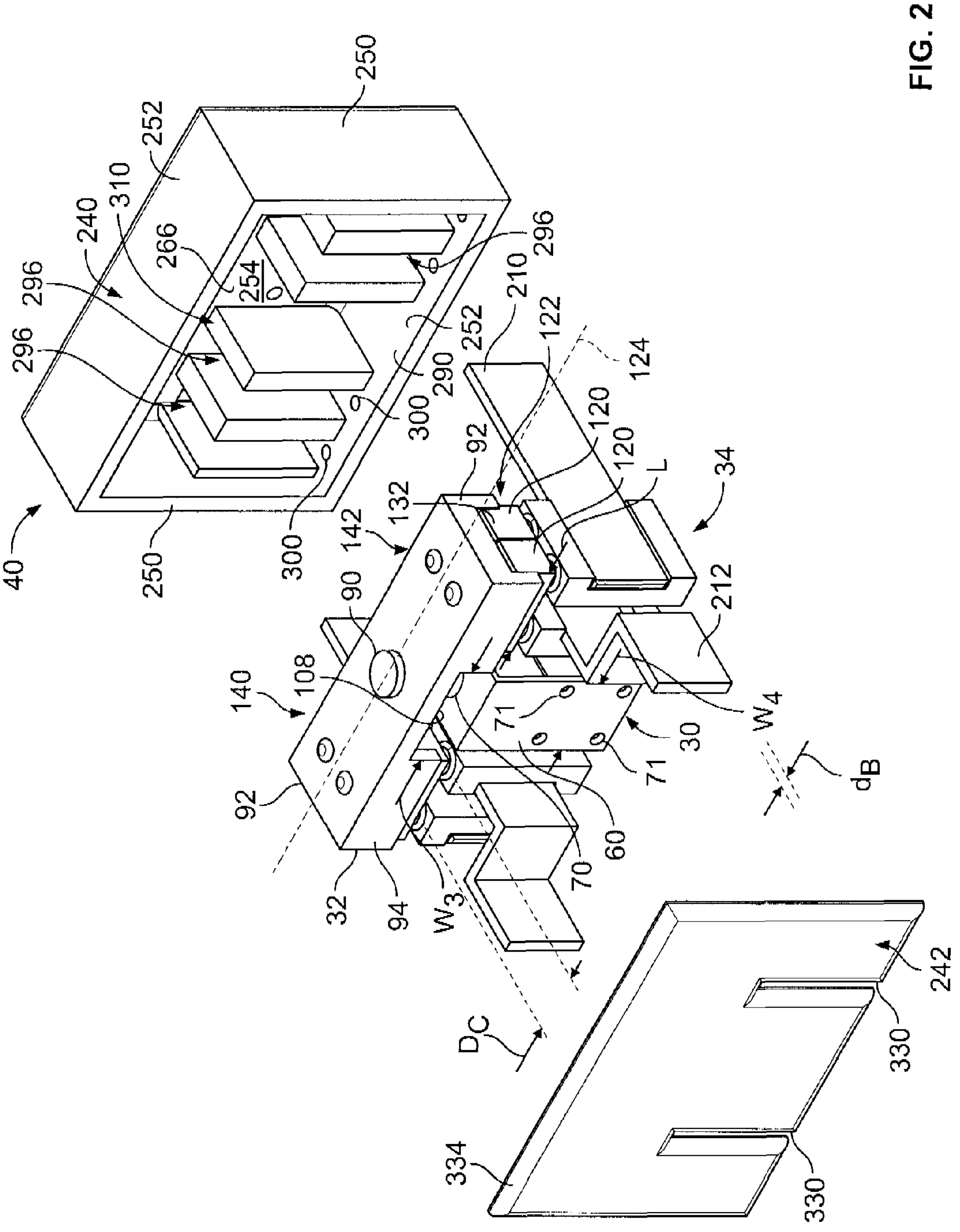
FIG. 2 is a partially exploded perspective schematic view of the electrical switching device shown in FIG. 1.
Figure 3:
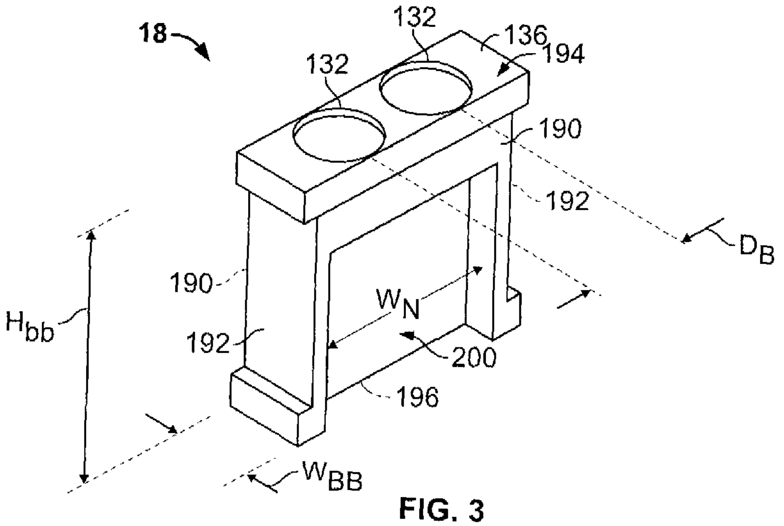
FIG. 3 is an enlarged perspective view of an exemplary conductor busbar that may be used with the switching device shown in FIGS. 1 and 2.
Figure 4:
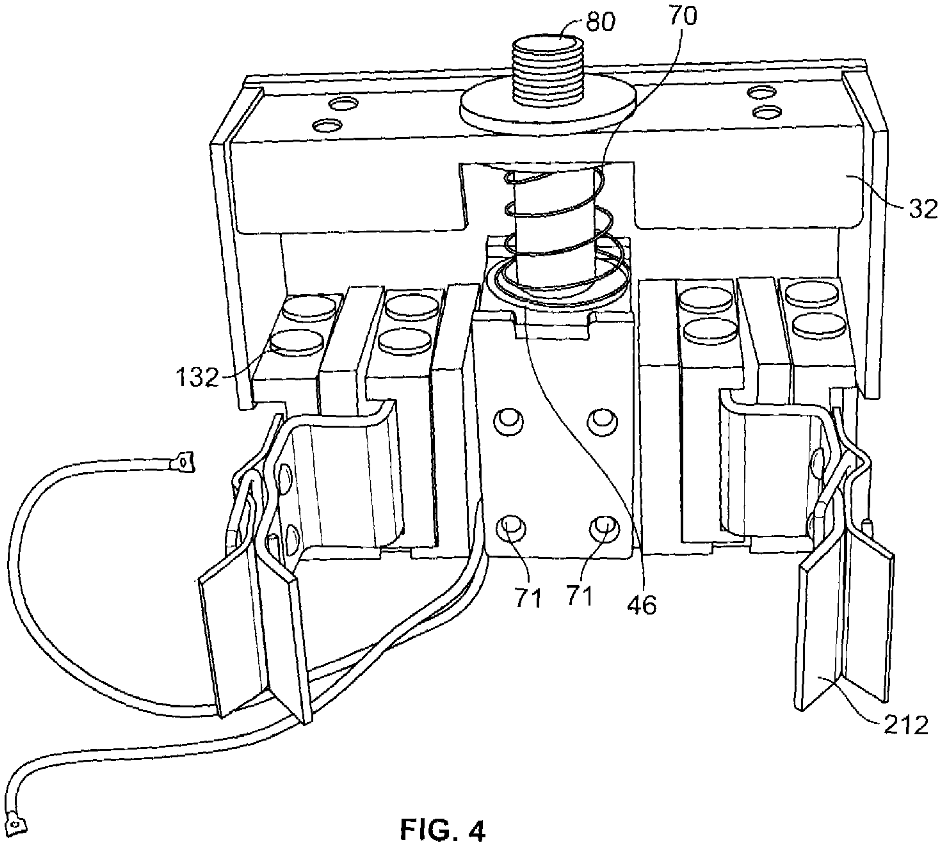
FIG. 4 is a perspective rear view of an alternative mounting configuration of the electrical switching device shown in FIGS. 1 and 2.
Figure 5:
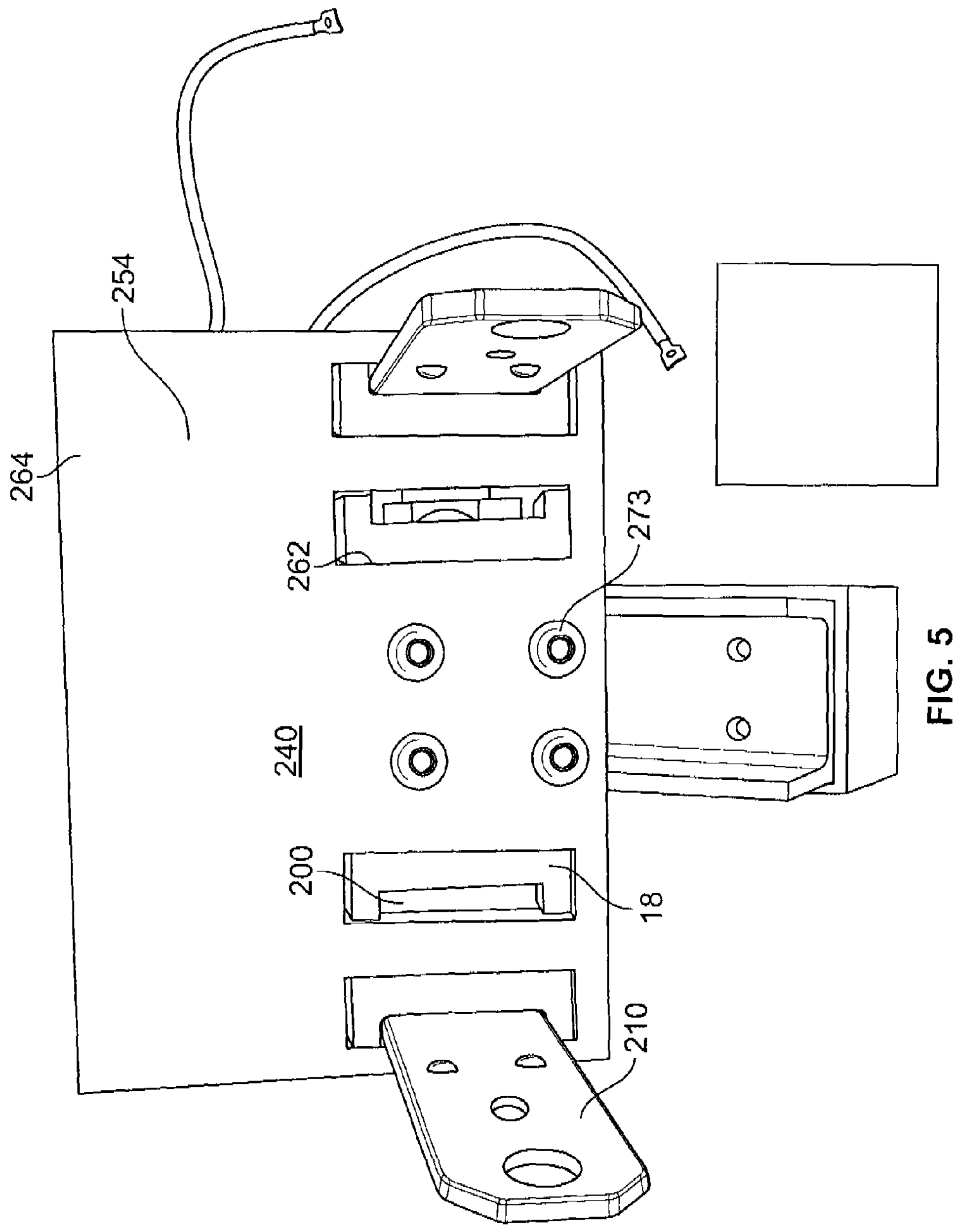
FIG. 5 is a perspective front view of another alternative mounting configuration of the electrical switching device shown in FIGS. 1 and 2.

FIG. 1 is a side view of an exemplary electrical switching device or assembly 10 electrically coupled to a known utility revenue meter 12 mounted to determine power consumption within a building (not shown). FIG. 2 is a partially exploded perspective view of electrical switching assembly 10. FIG. 3 is an enlarged perspective view of an exemplary conductor busbar element 18 that may be used with switching assembly 10. FIG. 4 is a perspective rear view of an alternative mounting configuration of electrical switching assembly 10. FIG. 5 is a perspective front view of another alternative mounting configuration of electrical switching assembly 10.

In the exemplary embodiment, electric meter 12 is used to measure electricity usage and to monitor power quality. Moreover, in the exemplary embodiment, meter 12 is a 2-Pole, 4 Jaw revenue meter that may be operable for both single phase and three phase electric power installations. Switching assembly 10 is electrically coupled in series between meter 12 and the residence, and as described in more detail below, enables authorized utility personnel to remotely and/or locally disconnect meter 12, thus isolating the utility power feed to the residence. In the exemplary embodiment, switching assembly 10 is sized to within a socket adapter coupled to meter 12, such as, but not limited to, a Marwell™ E/Z 1000-R4 meter extender adapter, commercially available from Marwell Company, Mentone, Calif. In some embodiments, switching assembly 10 is sized to fit within a recess (not shown) defined in meter 12.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In the exemplary embodiment, switch assembly 10 includes a solenoid assembly 30, a yoke 32, and a conductor busbar assembly 34. Moreover, in the exemplary embodiment, switch assembly 10 is housed within a housing 40, as described in more detail below. It should be noted that for simplicity, housing 40 has been removed from FIG. 1. Solenoid assembly 30 includes an electromagnet solenoid, an actuator plunger 44, and at least one magnet 46. In the exemplary embodiment, the electromagnetic solenoid is housed within a solenoid housing or shroud 50 and is coupled to plunger 44. Specifically, in the exemplary embodiment, the solenoid uses a magnetically latching solenoid actuator that is controlled by bi-directional DC voltage, as described in more detail below. Moreover, in the exemplary embodiment, a magnet (not shown), such as, but not limited to, a ferrous magnet, is contained within housing 50.

Solenoid housing 50, in the exemplary embodiment, is generally U-shaped and includes a first pair of opposing side walls 60, and an upper wall 64 that extends substantially perpendicularly between the pair of opposing side walls 60. In an alternative embodiment, housing 50 may have any other shape that enables solenoid assembly 30 to function as described herein. In the exemplary embodiment, housing upper wall 64 is coupled to side walls 60 and is fabricated from a different material than side walls 60. More specifically, in the exemplary embodiment, upper wall 64 is fabricated from, but is not limited to being fabricated from brass. Housing 50, as described in more detail below, facilitates shielding the solenoid and magnet from magnetic fields that may be produced within switch assembly 10.

In the exemplary embodiment, upper wall 64 includes an opening 69 defined therein that extends substantially concentrically through upper wall 64. Opening 69 is sized to receive at least a portion of actuator plunger 44 therethrough. Moreover, and in the exemplary embodiment, each side wall 60 includes a plurality of mounting openings 71 which enable solenoid assembly 30 to be securely coupled in position within housing 40.

Plunger 44, in the exemplary embodiment, is substantially cylindrical and has a substantially circular cross-sectional profile. In the exemplary embodiment, a biasing mechanism 70 circumscribes a portion of plunger 44 to bias yoke 32 away from solenoid assembly 30, as is described in more detail below. More specifically, in the exemplary embodiment, biasing mechanism 70 is a spring. In alternative embodiments, other biasing mechanisms that enable solenoid assembly 30 and switch assembly 10 to function as described herein may be used in place of, or in addition to, spring 70. In one embodiment, plunger 44 is fabricated from a ferrous material and is slidably coupled within the solenoid via a drive coil, for example.

Plunger 44 has a first end (not shown) coupled to the solenoid and a second end 80 that is coupled to yoke 32. More specifically, in the exemplary embodiment, magnet 46 is coupled between biasing mechanism 70 and solenoid assembly upper wall 64. In the exemplary embodiment, magnet 46 is a rare earth magnet. Alternatively, magnet 46 may be any magnet, or combination of magnets that enables solenoid assembly 30 and switch assembly 10 to function as described herein. In another alternative embodiment, solenoid assembly 30 and switch assembly 10 do not include magnet 46. In the exemplary embodiment, plunger second end 80 extends through an opening 90 defined in yoke 32 and is threadably coupled to yoke 32. In the embodiment, a leaf spring (not shown) is also coupled to yoke second end 80 to provide a pre-load to yoke 32.

In the exemplary embodiment, yoke opening 90 is substantially centered within yoke 32 and is sized to receive plunger second end 80 therethrough. Moreover, in the exemplary embodiment, yoke 32 is generally rectangular shaped and includes a first pair of opposing sides 92 that are coupled together via a second pair of opposing sides 94. More specifically, in the exemplary embodiment, sides 94 are each oriented and extend substantially perpendicularly between sides 92. In addition, yoke 32 includes an upper side 96 that is bordered by sides 94 and sides 92.

In the exemplary embodiment, yoke 32 is fabricated from a non-conductive material and is formed with a channel 100 that extends from one side 92 of yoke 32 to the opposite side 92 of yoke 32. Channel 100 has a width W that is narrower than a width $W_2$ of yoke 32 measured between opposing sides 94. Accordingly, channel 100 is bordered by substantially parallel walls 102 that extend from yoke sides 92 to a solenoid recess 108, and by an inner surface 110 that extends substantially perpendicularly between walls 102. Solenoid recess 108 has a width $W_3$ that is wider than an outer width $W_4$ of solenoid walls 60. Accordingly, when yoke 32 is moved towards solenoid housing 50, as described in more detail below, yoke 32 will not contact solenoid housing 50.

Channel width W is sized to receive a pair of side-by-side shorting bars 120 therein. In the exemplary embodiment, shorting bars 120 are identical and each is rectangular shaped. Furthermore, in the exemplary embodiment, shorting bars 120 are each fabricated from a conductive material, such as, but not limited to, copper. Moreover, the length L of each shorting bar 120 enables each bar 120, when coupled to yoke 32 as described in more detail below, to extend from yoke side 92 towards solenoid recess 108, without extending into recess 108. In addition, the width $W_{SB}$ is variably selected to enable a pair of side-by-side shorting bars 120 to be received in channel 100 and to facilitate reducing heat rise in switch assembly 10, as described in more detail below. For example, in the exemplary embodiment, width $W_{SB}$ is between, but is not limited to being, approximately 0.25 inches and 0.375 inches thick.

Shorting bars 120, in the exemplary embodiment, are arranged within yoke 32 in side-by-side pairs 122, wherein the shorting bars 120 within each pair 122 are substantially parallel to each other and are spaced a distance d apart that is substantially constant between the adjacent shorting bars 120. More specifically, in the exemplary embodiment, two pairs 122 are coupled within yoke 32, as described in more detail below. Moreover, each shorting bar 120 within each pair 122 is substantially centered between walls 102 and is oriented substantially parallel to a centerline axis 124 extending through yoke 32. In addition, in the exemplary embodiment, each shorting bar 120 includes a pair of contacts 130 that extend outward from an outer surface 132 of each shorting bar 120 and that are spaced a distance $D_c$ apart. More specifically, in the exemplary embodiment, each contact 130 is substantially circular and is oriented, as described in more detail below, to contact a respective mating contact 132 extending outward from an outer surface 136 of a respective conductor busbar element 18.

In the exemplary embodiment, two pairs 122 of shorting bars 120 are coupled within yoke 32 such that each pair 122 is positioned adjacent to an opposite side 92 of yoke 32. Moreover, in the exemplary embodiment, the two pairs 122 of shorting bars 120 are oriented in a mirrored relationship such that plunger 44 is positioned between the adjacent pairs 122 of shorting bars 120. In addition, the two pairs 122 of shorting bars 120 are oriented such that the each bar 120 in a first 140 of the pairs 122 is aligned substantially coaxially with each respective bar 120 in a second 142 of the pairs 122.

Each shorting bar 120 is coupled, in the exemplary embodiment, to yoke 32. More specifically, in the exemplary embodiment, each shorting bar 120 is slidably coupled to yoke 32 via a piston 146. Each piston 146 includes a first end 148 that is securely coupled to yoke 32, and a second end 150 that is slidably coupled to a respective shorting bar 120. Accordingly, during operation, each shorting bar 120 may move or "float" a short distance along piston 146. Moreover, during operation, each bar 120 within each pair 122 of shorting bars 120, may move independently of the other bar 120 within the same pair 122 of shorting bars 120. Specifically, because bars 120 are coupled within yoke 32, shorting bars 120 are moveable with yoke 32 towards and away from conductor busbar elements 18 during operation, as described herein. In addition, regardless of movement of yoke 32, each shorting bar 120 within each pair 122 is moveable independently of every other bar 120 coupled to yoke 32.

Each conductor busbar element 18 is fabricated from a conduct material, such as, but not limited to, copper, and in the exemplary embodiment, conductor busbar elements 18 are each generally rectangular shaped. Furthermore, in the exemplary embodiment, busbar elements 18 are arranged within assembly 34 in side-by-side pairs 180. More specifically, in the exemplary embodiment, the conductor busbar elements 18 within each pair 180 are substantially parallel to each other and are spaced a distance $d_1$ apart that is substantially constant between the adjacent busbar elements 18. Moreover, in the exemplary embodiment, two pairs 180 of busbar elements 18 are coupled within assembly 34, as described in more detail below. Furthermore, in the exemplary embodiment, each busbar element 18 within each pair 180 is oriented substantially perpendicularly to yoke centerline axis 124. In addition, in the exemplary embodiment, the contacts 132 on each busbar element 18 a distance $D_B$ apart. More specifically, in the exemplary embodiment, each contact 132 is substantially circular and is oriented, as described in more detail below, to contact a respective mating contact 130 extending outward from a respective shorting bar 120.

In the exemplary embodiment, two pairs 180 of busbar elements 18 are securely coupled within assembly 34 such that each pair 180 is positioned on an opposite side of solenoid housing 50. Moreover, in the exemplary embodiment, the two pairs 180 of busbar elements 18 are oriented symmetrically on each side of housing 50. Each shorting bar 120 is securely coupled in position such that during operation of switch assembly 10, each busbar element 18 remains stationary, regardless of movement of yoke 32.

In the exemplary embodiment, each conductor busbar element 18 has a generally rectangular shape that is defined by a first pair of opposing sides 190, and a second pair of opposing sides 192 that are each oriented substantially perpendicularly to the first pair of sides 190. Moreover, an upper side 194 and a lower side 196 are each oriented substantially perpendicularly to each pair of sides 190 and 192. Contacts 132 extend outward from upper side 194. Accordingly, each busbar element 18 has a height $H_{bb}$ that is measured between sides 194 and 196, and a width $W_{bb}$ that is measured between sides 190 and 192. The dimensions of each busbar element 18 are variably selected to facilitate operation of switch assembly 10 and to facilitate reducing heat rise in switch assembly 10, as described in more detail below. For example, in the exemplary embodiment, width $W_{bb}$ is between, but is not limited to being, approximately 0.25 inches and 0.375 inches thick.

Each conductor busbar element 18 is formed with a notch 200 along one side 190 or 192. In the exemplary embodiment, each notch 200 is substantially rectangular and either extends from lower side 196 towards upper side 194, as shown in the orientation of FIG. 3, or extends from one side 192 to the other side, along either side 194, as shown in the orientations of FIGS. 1, 2, 4, and 5. Each notch 200 has a width $W_n$ sized to receive a load side connector 210 and/or a line side connector 212. In the exemplary embodiment, load connector 210 is a blade, and line side connector 212 is a bi-furcated blade that forms a jaw that is configured to receive a stab or blade therein.

Specifically, each busbar element 18 can be fabricated to accommodate a variety of mounting orientations such that an electrical connector, such as, but not limited to, connectors 210 and/or 212 may extend from each busbar element 18 in any of three different orientations, i.e., a 3:00 orientation, a 6:00 orientation, or a 9:00 orientation. (The 3:00 orientation is illustrated in FIGS. 1, 2, and 5, the 9:00 orientation is illustrated in FIGS. 1, 2, and 4, and the 6:00 orientation is illustrated in FIG. 3). As a result, the busbar elements 18 accommodate a variety of connection angles and connection designs extending from meters and/or buildings, thus increasing the flexibility to utility installers and meter manufacturers, for example.

In addition, the width $W_n$ of each notch 200 is also selected to be only slightly larger than the width $W_c$ of any connector 210 or 212 received within that notch 200. As a result, when each connector 210 or 212 is coupled within a particular notch 200, that notch 200 facilitates providing structural support to the connection between the connector 210 or 212 and that respective busbar element 18. Furthermore, notches 200 facilitate "Murphy-proofing" switch assembly 10, as the notches 200 orient the connectors 210 and/or 212 relative to busbar assembly 34 and to switch assembly 10.

Within switch assembly 10, each busbar 18 is only securely coupled to only one connector 210 or 212. In one embodiment, a respective connector 210 or 212 is brazed to a respective busbar 18. Alternatively, a connector 210 or 212 may be coupled to a respective busbar using any known coupling means, including, but not limited to, mechanical coupling devices, and/or welding or bonding processes.

Switch assembly 10 is housed within housing 40. Housing 40 is exemplary only, and other housings with different sizes, shapes, and/or configurations may be used. Specifically, in the exemplary embodiment, solenoid assembly 30, yoke 32, and conductor busbar assembly 34 are housed within housing 40. In the exemplary embodiment, housing 40 is a multi-piece assembly that includes a meter-side or front-side portion 240 and a load-side or rear-side portion 242 that are coupled together to define a cavity 244 that is sized to receive switch assembly 10 therein. Moreover, when portions 240 and 242 are coupled together, the overall dimensions of housing 40 are variably selected depending on the application of switch assembly 10 and depending on the meter 12 to which switch assembly 10 is to be coupled to.

In the exemplary embodiment, front-side portion 240 includes a first pair of opposing walls 250 and a second pair of opposing walls 252 that extend substantially perpendicularly between walls 250. A front-side wall 254 extends substantially perpendicularly between walls 250 and walls 252. Accordingly, a portion of cavity 244 is defined by walls 250, 252, and 254. More specifically, when rear-side portion 242 is coupled to front-side portion 240, housing 40 is defined by a four-sided box-like structure, which is generally enclosed on each end, each side, and along its top and bottom. In the exemplary embodiment, walls 250, 252, and 254 are each substantially planar.

Front-side portion 240, in the exemplary embodiment, also includes a plurality of dividers 260 and a plurality of slotted openings 262 that extend from an outer surface 264 of wall 254 to an inner surface 266 of wall 254. More specifically, openings 262 are each shaped with a shape that is substantially similar to, and slightly larger than a cross-sectional shape of each busbar element 18, before any notches 200 are formed in the element 18. Accordingly, in the exemplary embodiment, each opening 262 is generally rectangular-shaped. In addition, openings 262 are oriented such that each busbar element 18 is substantially centered within a respective opening 262, when switch assembly 10 is fully assembled. As a result, openings 262 facilitate the assembly and disassembly of switch assembly 10, as described in more detail below. As such, in the exemplary embodiment, two openings 262 are defined in front-side wall between solenoid housing 50 and housing walls 250.

Housing front-side wall 254 also includes a plurality of mounting openings 270 that extend through wall 254 from outer surface 264 to inner surface 266. Openings 270 are substantially concentrically aligned with shroud housing openings 70 when shroud housing 50 is coupled within housing 40. More specifically, openings 270 enable shroud housing 50 to be securely coupled within housing 40 using any known coupling mechanisms, such as, but not limited to only, threaded fasteners 273.

Dividers 260 are spaced apart between housing walls 250 and each extends upward from an inner surface 290 of a lower housing wall 252. More specifically, each divider 260 extends substantially perpendicularly upward a height $H_d$ from inner surface 290 towards the opposite housing wall 252. In the exemplary embodiment, divider height $H_d$ is approximately the same as, or slightly taller than, busbar element height $H_{bb}$. Moreover, because dividers 260 are spaced apart, a plurality of gaps 296 are defined between adjacent pairs of dividers 260. Each gap 296 is sized to receive a respective busbar element 18 therein. Dividers 260 provide structural support to busbar elements 18 secured within gaps 296 and because dividers 260 are fabricated from a non-conductive material, dividers provide insulation between adjacent pairs of busbar elements 18, and between solenoid housing 50 and each adjacent busbar element 18.

In the exemplary embodiment, the lower housing wall 252 also includes a plurality of mounting openings 300 defined therein. Each opening 300 extends from inner surface 290 to an outer surface (not shown) of the lower housing wall 252. Openings 300 enable busbar elements 18 to be securely coupled in position within housing 40. Other openings 300 enable housing 40 to be securely coupled in position within a meter 12, for example. In addition, the lower housing wall 252 also includes at least a pair of slots (not shown) defined therein that accommodate a 6:00 mounting orientation of connectors 210.

Because dividers 260 extend only partially from surface 290 towards the opposite wall 240, a gap 310 is defined between the lower housing wall 252 and the opposite upper housing wall 252. Gap 310 is sized to receive yoke 32 therein and more specifically, is sized to enable yoke 32 to selectively move during operation of switch assembly 10, as described in more detail below.

In the exemplary embodiment, rear-side portion 242 is sized with approximately the same dimensions as front-side wall 254, such that an outer perimeter of portion 242 substantially mates against a perimeter defined by walls 250 and 252.

Moreover, in the exemplary embodiment, rear-side portion 242 is substantially planar and includes a pair of slots 330 defined therein. Specifically, in the exemplary embodiment, slots 330 extend from a lower edge 332 of portion 242 towards an upper edge 334 of portion 242. Slots 330 are oriented and sized to enable at least a portion of a connector 210 and/or 212 to extend therethrough when the connector 210 or 212 is securely coupled to a respective busbar element 18.

During assembly of switch assembly 10, in the exemplary embodiment, initially two pairs of shorting bars 120 are each coupled within yoke channel 100 via pistons 146. After all shorting bars 120 are coupled to yoke 32, the shorting bars 120 form a system of free-floating, movable conducting elements that, as described in more detail below, transfer current from the residential meter output (i.e., the line) to the residence (i.e., the load). Because the orientation of the shorting bars is not only mirrored, but is also symmetrical, shorting bars 120 are balanced about actuator plunger 44. As such, during operation, the orientation of shorting bars 120 facilitates yoke 32 providing a substantially consistent force being applied between each set of mating contacts 130 and 132. The length L of shorting bars 120 facilitates reducing heat rise within switch assembly 10. As a result of reduced heat rise, the useful life of switch assembly 10 is facilitated to be extended.

Plunger 44 is slidably coupled to the solenoid via a drive coil, for example, and is then securely coupled to yoke 32. More specifically, the second end 80 of plunger 44 is coupled to yoke 32 such that a leaf spring induces a pre-load into solenoid assembly 30. The pre-load is selected to facilitate ensuring that all eight sets of mating contacts 130 and 132 receive approximately the same contact force during switch assembly 10 operation.

Solenoid assembly 30 is coupled within housing front-side portion 240. As described above, the solenoid and at least one magnet, such as a ferrous magnet or a rare earth magnet, is housed within solenoid shroud 50. In addition, a rare earth magnet 46 is positioned between biasing mechanism 70 and solenoid housing upper wall 64. The magnet 46 facilitates increasing the magnetic holding forces that can be obtained from the magnetically-latching solenoid housed within shroud 50, without modifying the basic solenoid design. As a result, during operation solenoid assembly 30 can produce magnetic holding forces traditionally only available from larger, more expensive solenoid assemblies.

When solenoid housing 50 is positioned within front-side portion 240, mounting openings 71 formed in housing 50 are aligned substantially concentrically with openings 270 formed in front-side wall 254. In the exemplary embodiment, a plurality of fasteners 273 are then used to secure housing 50 within front-side portion 240. In addition, when housing 50 is positioned within portion 240, yoke 32 is positioned within front-side portion gap 310.

Two line side connectors 212 are then securely coupled to two busbar elements 18 such that at least a portion of each connector 212 is received in the notch 200 defined on each element 18. More specifically, the tight fit defined between each connector 212 and each respective notch 200 enhances the structural integrity of busbar assembly 34 and facilitates reducing and/or eliminating movement of connectors 212 within switch assembly 10 if switch assembly 10 is exposed to shock and/or vibration, or excess current forces. The two busbar elements 18, and their associated connectors 212, are then inserted within a respective gap 296 defined within front-side portion 240 such that connectors 212 extend outward from switch assembly 30 in a desired one of three mounting orientations described above. More specifically, in the exemplary embodiment, the two busbar elements 18, and their associated connectors 212, are inserted into the gaps 296 defined adjacent to solenoid housing 50. The two busbar elements 18 are then secured in position using threaded fasteners 273 extending through openings 300.

In one embodiment, two load-side connectors 210 are then each securely coupled to a respective busbar element 18 such that at least a portion of each connector 210 is received in the notch 200 defined on each element 18. More specifically, the tight fit defined between each connector 212 and each respective notch 200 enhances the structural integrity of busbar assembly 34 and facilitates reducing and/or eliminating movement of connectors 210 within switch assembly 10 if switch assembly 10 is exposed to shock and/or vibration, or excess current forces. The two busbar elements 18, and their associated connectors 210, are then inserted within a respective gap 296 defined within front-side portion 240. More specifically, in the exemplary embodiment, the two busbar elements 18, and their associated connectors 212, are inserted into the gaps 296 defined adjacent housing outer walls 250. The two busbar elements 18 are then secured in position using fasteners 273 extending through openings 300.

Alternatively, the two load-side connectors 210 may be coupled initially to the connectors (not shown) within meter 12. More specifically, because busbar elements 18 may be coupled within housing 40 from the rear-side of housing 40 before rear-side portion 242 is coupled to front-side portion 240, or may be slidably inserted and coupled into housing 40 through front-side portion openings 262, meter and meter collar manufacturers may pre-assemble the connectors 210 to their products prior to final assembly of switching assembly 10. For example, in one embodiment, switch assembly 10 may be bonded or coupled against an internal meter busing (not shown) within meter 12, rather than being coupled within a meter extension collar.

In either embodiment, rear-side portion 242 is coupled to front-side portion 240 and switching assembly 10 is electrically coupled to meter 12. More specifically, the slots 330 defined in rear-side portion 242 enable rear side portion 242 to be coupled to front-side portion 240 while connectors 212 extend outward from busbar elements 18. As a result, switching assembly 10, and more specifically, the rigid busbar assembly 34 created, accommodates a plurality of connection orientations. The various connection orientations facilitate simplifying the coupling and integration of switch assembly 10 between different types of meters, meter collars, and meter sockets. More generally, the construction of switching assembly 10 may easily be varied to facilitate optimizing the ease of integration into a plurality of varied platforms.

Regardless of the connection orientation used, switch assembly 10, the design of busbar elements 18 and shorting bars 120 ensures that contacts 130 and 132 mate during operation of switch assembly 10. As a result, when switch assembly 10 is fully assembled, two circuits are defined within switch assembly 10 between elements 18 and bars 120. Moreover, the design of busbar elements 18 and shorting bars 120 facilitates switch assembly 10 incorporating copper conductors that have a significantly larger cross-sectional area and a reduced conductor length within switch assembly 10 than in known switching devices. In addition, the design of busbar elements 18 and bars 120 facilitates reducing the number of switching elements used in the construction of such a switching device. As such, elements 18 and bars 120 facilitate reducing heat rise as compared to known switching devices operating with comparable current levels.

During operation, an appropriate DC voltage is supplied to solenoid assembly 30 to induce movement of solenoid plunger 44. Specifically, in the exemplary embodiment, the solenoid uses a magnetically latching solenoid actuator that is controlled by bi-directional DC voltage. As a result, only a short DC voltage pulse is necessary of its operating and release functions. As the DC voltage is initially supplied to the solenoid assembly 30, solenoid plunger 44 is shifted downward to move yoke 32 from an open position, in which shorting bars 120 are spaced a distance above busbar assembly 34, to a closed or latched position in which shorting bars 120 are positioned in contact with busbar elements 18. Specifically, when yoke 32 is latched in position against busbar assembly 34, shorting bar contacts 130 are positioned in electrical contact against busbar element contacts 132.

The solenoid plunger 44 is latched in position by the magnet contained in the solenoid housing 50 and by the rare earth magnet 46 positioned between biasing mechanism 70 and solenoid housing upper wall 64. Magnet 46 facilitates increasing the magnetic holding forces. The enhanced magnet force facilitates operating the switch assembly with a rated device current level of at least 200 Amps or greater, with a minimum heat rise across the switched electrical contacts 130 and 132. Moreover, the enhanced magnetic force induced by magnet 46 facilitates switching assembly 10 opening or closing contacts 130 and 132 rapidly enough to limit arcing between contacts 130 and 132. Because shorting bars 120 are "free floating" the force induced to contacts 132 from contacts 130 should be approximately the same across all pairs of mating contacts 130 and 132 within switch assembly 10.

When solenoid plunger 44 is latched in the closed position, current is supplied to the residence. When another appropriate DC voltage is supplied to solenoid assembly 30, solenoid plunger 44 is selectively moved to the open position, and because each of the two circuits defined within switch assembly 10 are opened, current is no longer supplied to the residence. When DC voltage is removed, yoke 32 is biased by biasing mechanism 70 to remain in the open position.

Switch assembly 10 can be disconnected and/or reconnected locally or remotely. Manual disconnection/reconnect can be accomplished by removing an access cover (not shown) secured to the utility meter 12 and selectively operating a toggle switch (not shown) contained therein. In the exemplary embodiment, LED lights (not shown) are also included to indicate when switch assembly 10 is in the closed position and customer power is connected. In one embodiment, switch assembly 10 is coupled to an IPS controller module that enables remote control of switch assembly 10.

Exemplary embodiments of a remote controlled/locally controlled switching assembly are described above in detail. Although the methods and systems described herein are herein described and illustrated in association with a residential electric meter, it should be understood that the present invention may be used with any other electrical systems. More specifically, the switching assembly described herein is not limited to only being used with the architecture, components, or with the specific embodiments described herein, but rather, aspects of the switching assembly and/or the method of controlling power to a consumer may be utilized independently and separately from other switching assemblies and other power control methods.

Moreover, based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its exemplary embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a general and descriptive sense on and not for the purpose of limitation.

While the invention has been described in terms of various specific embodiments, those skilled in the art will recognize that the invention can be practiced with modification within the spirit and scope of the claims.

What is claimed is:

1. An electrical switching device for use with an electrical-energy meter, said switching device comprising:

a solenoid assembly comprising an electromagnetic solenoid, an actuator plunger coupled to said solenoid, and at least one magnet;

a yoke coupled to said actuator plunger such that said yoke is biased away from said solenoid, said yoke comprises a channel at least partially defined by a first wall and a second wall that is substantially parallel to said first wall, a first pair of shorting bars and a second pair of shorting bars positioned within said channel on opposite sides of said actuator plunger and between said first and second walls, each of said pairs comprises a first shorting bar and a second shorting bar that each float independently of each other within said channel such that each of said shorting bars is moveable independently of said yoke and independently of each other, wherein said first and second shorting bars are not coupled to said yoke by a coil spring; and at least two conductor busbars electrically coupled within said switching device such that at least a first circuit and a second circuit are defined within said switching device, said solenoid assembly is configured to selectively move said yoke between a first position in which at least one of said shorting bars is a distance away from said at least two conductor busbars, and a second position in which at least one of said shorting bars is electrically coupled against at least one of said at least two conductor busbars, each of said two conductor busbars comprises a first end, a second end, and a body extending therebetween, said body has a substantially rectangular cross-sectional profile.

2. An electrical switching device in accordance with claim 1 wherein each of said bodies comprises a notch defined therein, each of said notches is sized to receive a portion of a stab and jaw electrical connector therein.

3. An electrical switching device in accordance with claim 1 wherein said solenoid assembly further comprises a solenoid housing, said solenoid and said at least one magnet are contained within said solenoid housing.

4. An electrical switching device in accordance with claim 3 further comprising at least one rare earth magnet coupled between said yoke and said solenoid housing to facilitate increasing a switching force of said solenoid assembly.

5. An electrical switching device in accordance with claim 1 further comprising a switching device housing comprising an upper wall, a lower wall, a first pair of opposing sidewalls, and a second pair of opposing sidewalls, said upper and lower walls are coupled together by said first pair of opposing sidewalls, at least one of said second pair of opposing sidewalls comprises at least one slot defined therein, said solenoid assembly, said yoke, and said at least two conductor busbars are contained within said switching device housing.

6. An electrical switching device in accordance with claim 5 wherein each of said at least two conductor busbars further comprises a pair of electrical contacts extending from said body, each of said conductor busbars is configured to couple within said switching device housing in three different orientations.

7. An electrical switching device in accordance with claim 1 wherein each of said at least two conductor busbars are identical and each has a height measured between a first pair of opposing sides, and a width measured between a second pair of opposing sides.

8. An electrical switching device in accordance with claim 7 wherein each of said at least two conductor busbars has a thickness of approximately 0.25 inches.

9. An electrical switching device in accordance with claim 1 wherein said yoke has a major axis of symmetry and a minor axis of symmetry each of said shorting bars has a major axis of symmetry and a minor axis of symmetry, wherein said major axis of symmetry of said yoke is substantially aligned with said major axis of symmetry of each of said shorting bars, said first pair of shorting bars are substantially parallel to each other, said second pair of shorting bars are substantially parallel to each other, and said channel is sized to receive said first and second pairs of shorting bars.

10. An electrical switching device in accordance with claim 9 wherein each of said first pair and said second pair of shorting bars are slidably coupled to said yoke.

11. An electrical switching device in accordance with claim 1 wherein said at least two conductor busbars facilitate reducing heat rise within said electrical switching device.

12. An electrical switching device for use in selectively controlling residential power feed, said switching device configured to couple between a residential electrical-energy meter and a residence, said switching device comprising:

a solenoid assembly comprising an electrically-activated solenoid coupled to an actuator assembly, said actuator assembly comprising a biasing mechanism and a plunger;

a yoke coupled to said actuator plunger such that said actuator plunger is substantially centered relative to said yoke, said biasing mechanism coupled to said yoke such that said yoke is biased away from said solenoid, said yoke comprises a first pair of shorting bars positioned within a first channel and a second pair of shorting bars positioned within a second channel and oriented in a mirrored-arrangement on opposite sides of said actuator plunger, said first and second channels at least partially defined by a first wall and a second wall that is substantially parallel to said first wall, wherein said first and second channels are substantially collinear, each of said pairs comprises a first shorting bar and a second shorting bar that each float independently of each other within said respective channel such that each of said shorting bars is moveable independently of said yoke and independently of each other other, wherein said first and second shorting bars are not coupled to said yoke by a coil spring; and at least two conductor busbars coupled within said switching device, said solenoid assembly is configured to selectively move said yoke between a first position in which said first and second pairs of shorting bars are spaced a distance away from said at least two conductor busbars, and a second position in which each of said first and second pairs of shorting bars are electrically coupled against at least one of said at least two conductor busbars, each of said at least two conductor busbars has a substantially rectangular-shaped cross-sectional profile.

13. An electrical switching device in accordance with claim 12 wherein each of said at least two conductor busbars comprises a notch defined therein and sized to receive an electrical connector extending from one of the residence and the residential electrical-energy meter, each of said at least two conductor busbars is configured to couple within said electrical switching device in three different orientations.

14. An electrical switching device in accordance with claim 12 wherein said yoke has a major axis of symmetry and a minor axis of symmetry, each of said shorting bars has a major axis of symmetry and a minor axis of symmetry, wherein said major axis of symmetry of said yoke is substantially aligned with said major axis of symmetry of each of said shorting bars, said first pair of shorting bars are substantially parallel to each other, said second pair of shorting bars are substantially parallel to each other, said channel is sized to receive said first and second pairs of shorting bars, each of said first pair of shorting bars is substantially collinearly aligned with one of said second pair of shorting bars.

15. An electrical switching device in accordance with claim 14 wherein each of said first pair and said second pair of shorting bars is slidably coupled to said yoke such within each said pair of shorting bars.

16. An electrical switching device in accordance with claim 12 said solenoid assembly further comprises at least one magnet coupled between said biasing mechanism and said solenoid.

17. An electrical switching device in accordance with claim 12 wherein each of said two conductor busbars comprises a pair of opposing sides, a front side, and a rear side, a thickness of each of said two conductor busbars measured between said pair of opposing sides is approximately 0.25 inches.

18. An electrical switching device in accordance with claim 12 wherein said at least two conductor busbars facilitate reducing heat rise within said electrical switching device.

19. An electrical switching device in accordance with claim 12 wherein said device has a full load current capability of at least approximately 200 Amps.

* * * * *